3,353,339
GAS CLEANER

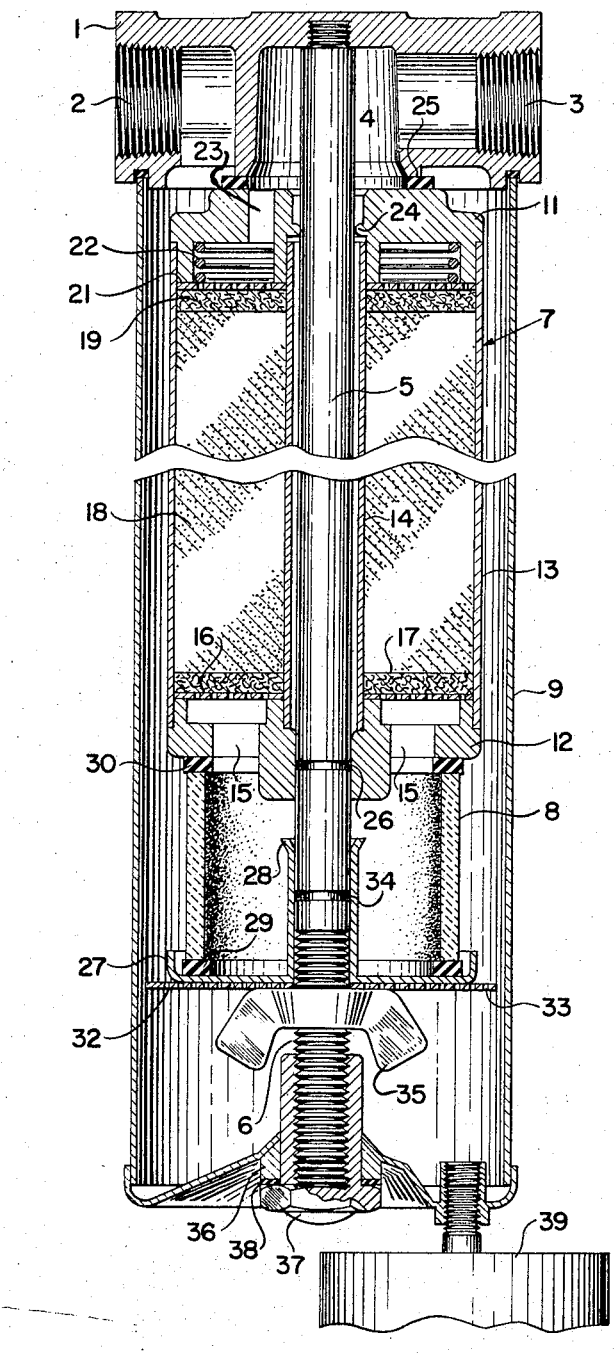

Bernard R. Walter, Roslyn, Pa., assignor to Selas Corporation of America, Dresher, Pa., a corporation of Pennsylvania
Filed Oct. 8, 1964, Ser. No. 402,387
6 Claims. (Cl. 55—316)

ABSTRACT OF THE DISCLOSURE

An in-line, point-of-use air cleaner comprising a container into which air is introduced to flow to a point of discharge and use successively through a porous hydrophobic membrane to remove entrained liquid and dirt, a disposable canister filled with an adsorbent, usually activated carbon, to remove oil vapor and oil mist, and finally through a filter pad to remove any adsorbent fines that may have been picked up.

---

The present invention relates to apparatus for removing dirt, liquids and vapors from air or other gases. One of the principal uses of apparatus of the present type is to clean air for instrument use or other critical pneumatic operations. Air coming from a compressor will frequently carry along with it dirt, oil and water droplets as well as oil vapor. These contaminants must be removed before the air is in satisfactory condition for use.

It is an object of the invention to provide an air filtering or purifying apparatus. It is a more specific object of the invention to provide apparatus for the continuous removal of dirt, oil, water and vapor of oil or water from air or other gases.

For purposes of this description, air will be described as the gas being treated although it will be apparent that other gases may be similarly treated by the same apparatus.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

The single figure of drawing shows a section through the apparatus.

The apparatus is supported by a casting 1 which has an inlet passage 2 and an outlet passage 3 that are in axial alignment. Passage 3 communicates with an outlet chamber 4 that has a circular inlet thereto facing downwardly. A rod 5, whose lower end is threaded as indicated at 6, is fastened to support 1 and extends downwardly therefrom through the inlet to chamber 4. This rod supports a canister 7 containing an adsorbing material, a liquid and dirt removing filter element 8 and the cup-shaped case 9 for the apparatus.

The canister includes a top 11 and a bottom 12 that may be made of either a plastic or metal. These members are joined by a pair of rigid tubes 13 and 14 made of metal, cardboard or the like. The tubes are cemented or otherwise suitably attached to the end pieces 11 and 12 to form an annular chamber through which the gas to be purified passes in an axial direction. For this purpose end piece 12 has an annular ring of openings 15 leading into the chamber and end piece 11 has a series of openings 23 so spaced that they will discharge into chamber 4. Immediately above end plate 12 is a perforated metal disc 16 and a pad 17 of fibrous material such as glass fiber. The granular adsorbing material 18 with which the chamber is filled, rests on the pad 17. Above this material is a second fiber pad 19 and a second perforated metal disc 21. In order to prevent the particles of adsorbing material moving relative to each other as much as possible while the canister is being handled, there is provided a spring 22 which tends to force disc 21 downwardly toward the bottom of the canister thus keeping the material in a compact mass. It is noted that end plate 11 has inwardly extending shoulder 24 that engages the rod 5 in order to center and to help guide the canister as it is being placed in position, and that there is provided a gasket 25 between the upper end of the canister and the edge of the opening leading to chamber 4. There is also provided an O-ring 26, received in a groove cut in the rod, which serves to seal the space between end plate 12 and the rod, thereby to prevent any gas from flowing up through the center of the canister instead of through the adsorbing material it contains.

After the canister has been moved into place on rod 5, filter element 8, which is preferably a porous ceramic cylinder, is moved into place against the lower end of the canister with a gasket between the two. Element 8 is supported by disc 27 which is provided with an axially extending sleeve 28 that slides along rod 5. The disc carries a gasket 29 which engages the lower end of the element. There is provided an O-ring 34, received in a groove in rod 5, to seal the space between sleeve 28 and the rod. The various parts are held in place on rod 5 by means of a thumb nut 35 that is screwed on the threaded portion 6 of rod 5 to force the element 8 and the canister 7 upwardly against the entrance of chamber 4. The gaskets 25 and 29 and a gasket 30 between element 8 and the lower end of the canister prevent the flow of gas between these various parts and the O-rings 26 and 34 prevent any gas from by-passing these elements up the shaft 5 so that gas must move radially through filter element 8. It is noted that a disc 32 is placed on the rod below plate 27. This disc has fingers 33 extending radially from its edge to help guide the casing 9 when it is placed on rod 5.

Casing 9 is provided with a sleeve 36 to form an abutment for the cap of a cap screw 37 that is threaded to the lower end of rod 5. A gasket 38 is provided between the screw and sleeve 36. After the canister and filter element have been placed on the rod, casing 9 is moved around them with its upper end against support 1, and nut 37 is threaded on rod 5 to hold the casing in position. Since liquid is removed from the gas as it flows through the apparatus, there is provided some means, shown herein diagrammatically as a ball float trap 39, through which the liquid can be removed automatically during the operation of the apparatus. If the amount of liquid is small, an ordinary petcock could be substituted for the trap.

The canister 7 is filled with an adsorbing material of a type depending upon what the apparatus is to be used for. If, for example, the apparatus is being used to remove oil vapor from the gas, the material in the canister with be activated carbon. If water vapor is to be removed, the material in the canister will be silica gel. Where both vapors are to be removed, the canister can be filled partly with activated carbon and partly with silica gel, or two small canisters, each filled with one material, can be used. It is noted that the fibrous material 19 will prevent small particles of the adsorbent from leaving the canister with the gas.

Filter element 8 is made of a porous refractory or other rigid porous material that will serve to filter out dirt in particle form. Preferably, at least the outer surface has been treated with some conventional hydrophobic material. When treated in this manner any liquid droplets carried by the gas being cleaned, will strike against the outer surface of element 8 and will be retained on that surface. These droplets will coalesce and flow to the bottom of casing 6 where they are discharged by the trap 39 or through a manually operated petcock.

In the use of the apparatus it is only necessary to remove a small section of a pipe through which gas is flowing so that the ends of the pipe can be threaded into inlet 2 and outlet 3. Assuming that the apparatus has been assembled in the manner described above, the gas to be treated will flow through the inlet 2 and downwardly around the outside of the canister. This gas will then flow radially through filter element 8 which removes dirt, water and water-oil emulsions. An element of this type however, is unable to remove vapor, which acts as a gas. The gas with the solid and liquid particles removed from it, passes axially upwardly through the openings 15 into the canister. As the gas travels through the adsorbing material in the canister, vapor, which may be either oil vapor or water vapor or both, is removed from the gas so that the purified gas will flow through openings 23 into chamber 4 and be discharged from the apparatus through outlet 3.

From the above description it will be seen that I have provided a compact and simple gas purifying apparatus that can be placed in a gas line with a minimum of trouble. The apparatus can be easily disassembled for cleaning of the filter element and for replacement of the canister. Replacing them merely requires moving the elements into place and fastening them on the rod with a single nut. The entire apparatus is provided with suitable gaskets so that there is no possibility for untreated gas passing directly from the inlet to the outlet.

While in accordance with the provisions of the statutes I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. Apparatus for cleaning gas comprising a support having aligned inlet and discharge openings, said support being provided with an outlet chamber connected with said discharge opening and an inlet to said chamber, a rod attached to said support and extending therefrom through said chamber inlet, an elongated, annular canister filled with vapor adsorbing material received on said rod to be moved against said chamber inlet, said canister being provided with openings in the ends thereof whereby gas can pass axially therethrough into said chamber, means to seal the space between said rod and said canister, an annular filter element having open ends and have a hydrophobic surface, one of said ends engaging the end of said canister remote from said chamber inlet, a disc having a centrally located and axially extending sleeve thereon with said sleeve received on said rod and said disc engaging and sealing the other end of said filter element whereby flow of gas to be cleaned is radially through said element, sealing means between said sleeve and rod, means to force said disc against said filter element, a casing surrounding said canister, filter element and rod and engaging said support, and means effecting communication between the inside of said casing and said inlet opening.

2. In combination, a support having an inlet and an outlet with a circular entrance, a rod attached to said support and extending through said entrance and substantially perpendicular thereto, an elongated, annular canister filled with a vapor adsorbent and being provided with an opening in each end for axial passage of gas, said canister being received on said rod with an opening in an end in communication with the entrance to said outlet, a rigid, annular porous element through which gas can pass radially, one surface of which is hydrophobic, said element surrounding said rod and in end to end relation with said canister with the interior of said element communicating with the opening in the end of said canister, means engaging the other end of said element to close said other end and to hold said element and canister on said rod in engagement with each other and said canister in engagement with said support, and a casing surrounding said canister and element and engaging said support in such a manner that the space between said canister and casing communicates with said inlet.

3. The combination of claim 2 in which seals are provided between said support and canister, said canister and element, said element and engaging means and between said rod and said canister and said engaging means.

4. In combination, an annular, cylindrical element formed of porous material, one surface of said element being hydrophobic, an elongated canister in the form of an annular chamber, the ends of said chamber each having an opening therein, a shaft extending through said element and canister means, fastening said canister and element in end to end engagement on said shaft with the interior of said element communicating with one of the openings in an end of said canister, said means including a seal between said canister and shaft and a seal between said element and shaft, means to supply a gas to be treated to the exterior of said element to flow radially therethrough and means through which treated gas is discharged from the opening in the end of said canister remote from said element.

5. Apparatus for cleaning gas comprising in combination a canister in the form of an elongated annular chamber, said chamber being filled with an adsorbent material, said canister being provided in each end with an opening to said chamber through which gas can flow axially, a rigid, annular element of porous material the outer surface of which is treated to be hydrophobic and through which gas can flow radially, a disc to close one end of said element, a support, a rod projecting from said support and extending through said canister, element and disc in the order named, means cooperating with said rod to force said canister, element and disc against each other and said canister against said support with the interior of said element communicating with an opening in the end of said chamber, means in said support communicating with an opening in said canister to form an outlet passage, means attached to said support forming a casing around said canister and element, and means in said support forming an inlet passage to the space between said casing and canister.

6. Apparatus for cleaning gas comprising in combination a support having axially aligned inlet and outlet ports and a chamber communicating with said outlet port and an entrance to said chamber perpendicular to the axis of said port, a rod attached to said support and projecting therefrom through said entrance, an elongated canister annular in shape and having a chamber therein, the ends of said canister having openings to the chamber whereby gas can flow axially through the same, said canister being filled with an adsorbing material, a filter element in the shape of a hollow cylinder through which gas can flow radially, said filter element having a hydrophobic surface, said canister and element being telescoped over said rod in end to end relation with one end of said canister engaging said support around said entrance, a member received by said rod closing the end of said element away from said canister, means on said rod to force said disc, element, and canister against each other and said canister against said support, a cup-shaped casing surrounding and spaced from said canister and element, means to force said casing against said support, and means connecting said inlet port with the interior of said casing.

References Cited

UNITED STATES PATENTS

| | | | |
|---|---|---|---|
| 2,377,549 | 6/1945 | Gustaffsson et al. | 55—318 |
| 2,383,065 | 8/1945 | Lehman | 55—316 |
| 2,592,132 | 4/1952 | Gannon | 55—387 |
| 2,669,318 | 2/1954 | Briggs | 55—387 |
| 2,758,719 | 8/1956 | Line | 55—387 X |
| 2,929,503 | 3/1960 | Ambruster et al. | 55—316 X |
| 3,080,977 | 3/1963 | Jones | 55—316 X |

FOREIGN PATENTS 645,513    7/1962    Canada.

HARRY B. THORNTON, *Primary Examiner.*

S. W. SOKOLOFF, *Assistant Examiner.*